United States Patent
Lor et al.

(10) Patent No.: US 9,488,207 B2
(45) Date of Patent: Nov. 8, 2016

(54) FASTENING SYSTEM

(75) Inventors: Ferenc Lor, Buchs (CH); Stefan Boenig, Achberg-Esseratsweiler (DE); Christian Mathesius, Frenkendorf (CH)

(73) Assignee: HILTI AKTIENGESELLSCHAFT, Schaan (LI)

(*) Notice: Subject to any disclaimer, the term of this patent is extended or adjusted under 35 U.S.C. 154(b) by 131 days.

(21) Appl. No.: 14/347,509

(22) PCT Filed: Jul. 10, 2012

(86) PCT No.: PCT/EP2012/063476
§ 371 (c)(1),
(2), (4) Date: Jul. 3, 2014

(87) PCT Pub. No.: WO2013/045130
PCT Pub. Date: Apr. 4, 2013

(65) Prior Publication Data
US 2014/0314521 A1 Oct. 23, 2014

(30) Foreign Application Priority Data
Sep. 29, 2011 (DE) .......... 10 2011 083 779

(51) Int. Cl.
*F16B 15/00* (2006.01)
*F16B 19/14* (2006.01)

(52) U.S. Cl.
CPC .......... *F16B 19/14* (2013.01); *Y10T 29/4987* (2015.01); *Y10T 29/49826* (2015.01)

(58) Field of Classification Search
CPC ....... F16B 15/00; F16B 19/14; F16B 43/001
USPC ....... 411/338, 371.1–371.2, 372.5, 388, 441, 411/469, 487, 489, 517, 542
See application file for complete search history.

(56) References Cited

U.S. PATENT DOCUMENTS

| | | | | |
|---|---|---|---|---|
| 2,576,473 A * | 11/1951 | Meyers | ...... | B25C 1/12 227/11 |
| 2,637,241 A * | 5/1953 | Erickson | ...... | B25C 1/18 102/527 |
| 2,666,252 A * | 1/1954 | Temple | ...... | B25C 1/18 29/432 |
| 2,724,303 A | 11/1955 | Holcomb | | |
| 2,855,817 A * | 10/1958 | Kopf | ...... | B25C 1/18 411/441 |
| 2,887,925 A * | 5/1959 | Kopf | ...... | F16B 19/14 29/432 |

(Continued)

FOREIGN PATENT DOCUMENTS

DE  10 09 570 B   5/1957
DE  1 475 052 B1  11/1969

(Continued)

OTHER PUBLICATIONS

Search Report, German Application No. 10 2011 083 779.5, dated Aug. 24, 2012.

(Continued)

*Primary Examiner* — Roberta Delisle
(74) *Attorney, Agent, or Firm* — Jeremy Jay

(57) ABSTRACT

A fastening system for fastening an add-on part on a setting object comprises a setting bolt having a first end and a second end, comprising a fastening section and a load application section, a sealing element with an opening for sealing the setting bolt inserted into the setting object when the setting bolt is arranged within the opening, and the add-on part being fastened on the load application section of the setting bolt.

14 Claims, 4 Drawing Sheets

(56) References Cited

U.S. PATENT DOCUMENTS

| | | | | |
|---|---|---|---|---|
| 2,914,983 A | * | 12/1959 | Kopf | B25C 1/16 411/29 |
| 2,999,571 A | * | 9/1961 | Huber | F16B 19/14 227/9 |
| 3,320,845 A | | 5/1967 | Eschweiler | |
| 3,377,903 A | | 4/1968 | Everardus | |
| 3,480,306 A | * | 11/1969 | Hsu | F16B 13/126 246/169 A |
| 3,491,933 A | * | 1/1970 | Thurner | F16B 19/14 227/11 |
| 3,611,863 A | | 10/1971 | Bayer et al. | |
| 4,287,656 A | * | 9/1981 | Gassman | F16B 19/14 227/119 |
| 4,802,802 A | | 2/1989 | Thurner | |
| 4,915,561 A | | 4/1990 | Buhri et al. | |
| 4,979,858 A | * | 12/1990 | Van Allman | F16B 19/14 411/394 |
| 4,986,709 A | * | 1/1991 | Hachtel | F16B 13/002 411/30 |
| 5,044,851 A | * | 9/1991 | Gschwend | F16B 13/126 411/44 |
| 5,730,570 A | * | 3/1998 | Buhofer | F16B 19/14 411/440 |
| 5,992,122 A | * | 11/1999 | Rohrmoser | E04D 5/145 411/147 |
| 6,308,468 B1 | * | 10/2001 | Caruso | E04H 12/2215 248/530 |
| 6,824,342 B2 | * | 11/2004 | Gassmann | F16B 19/14 411/441 |
| 2010/0111640 A1 | | 5/2010 | Buhri et al. | |

FOREIGN PATENT DOCUMENTS

| | | |
|---|---|---|
| DE | 14 78 868 A1 | 4/1970 |
| DE | 17 50 989 B2 | 8/1975 |
| DE | 90 11 917 U1 | 10/1990 |
| DE | 20209675 U1 | 10/2002 |
| DE | 10 2008 018 429 A1 | 10/2008 |
| DE | 10 2008 043435 A1 | 5/2010 |
| EP | 0 282 445 A1 | 9/1988 |
| EP | 0 321 396 A2 | 6/1989 |
| FR | 1 566 657 A | 5/1969 |
| GB | 1 104 014 A | 2/1968 |

OTHER PUBLICATIONS

Search Report, Chinese Application No. 201280047471.7, mailed on Apr. 3, 2015.
International Search Report, International Application No. PCT/EP2012/063476 mailed Sep. 19, 2012.

* cited by examiner

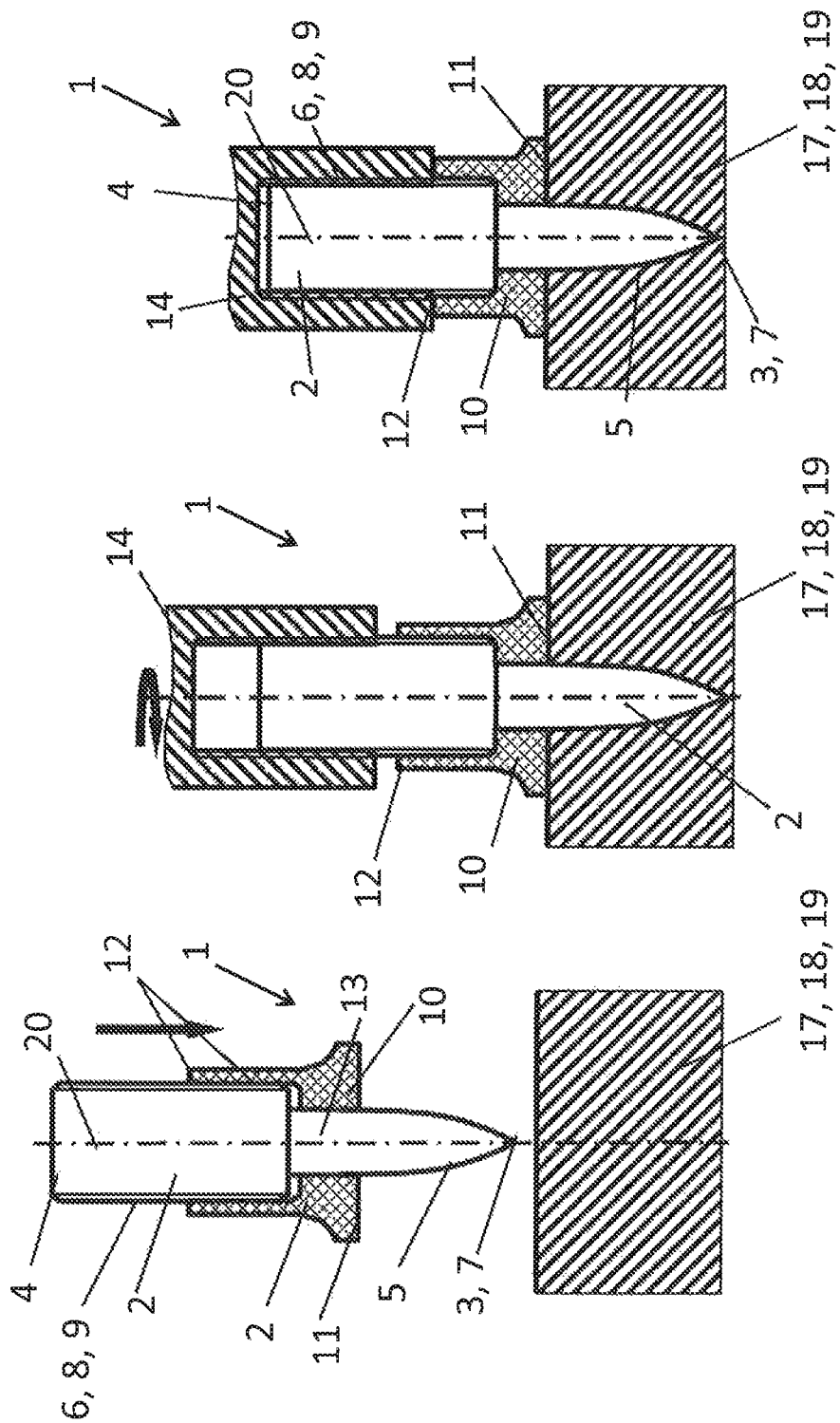

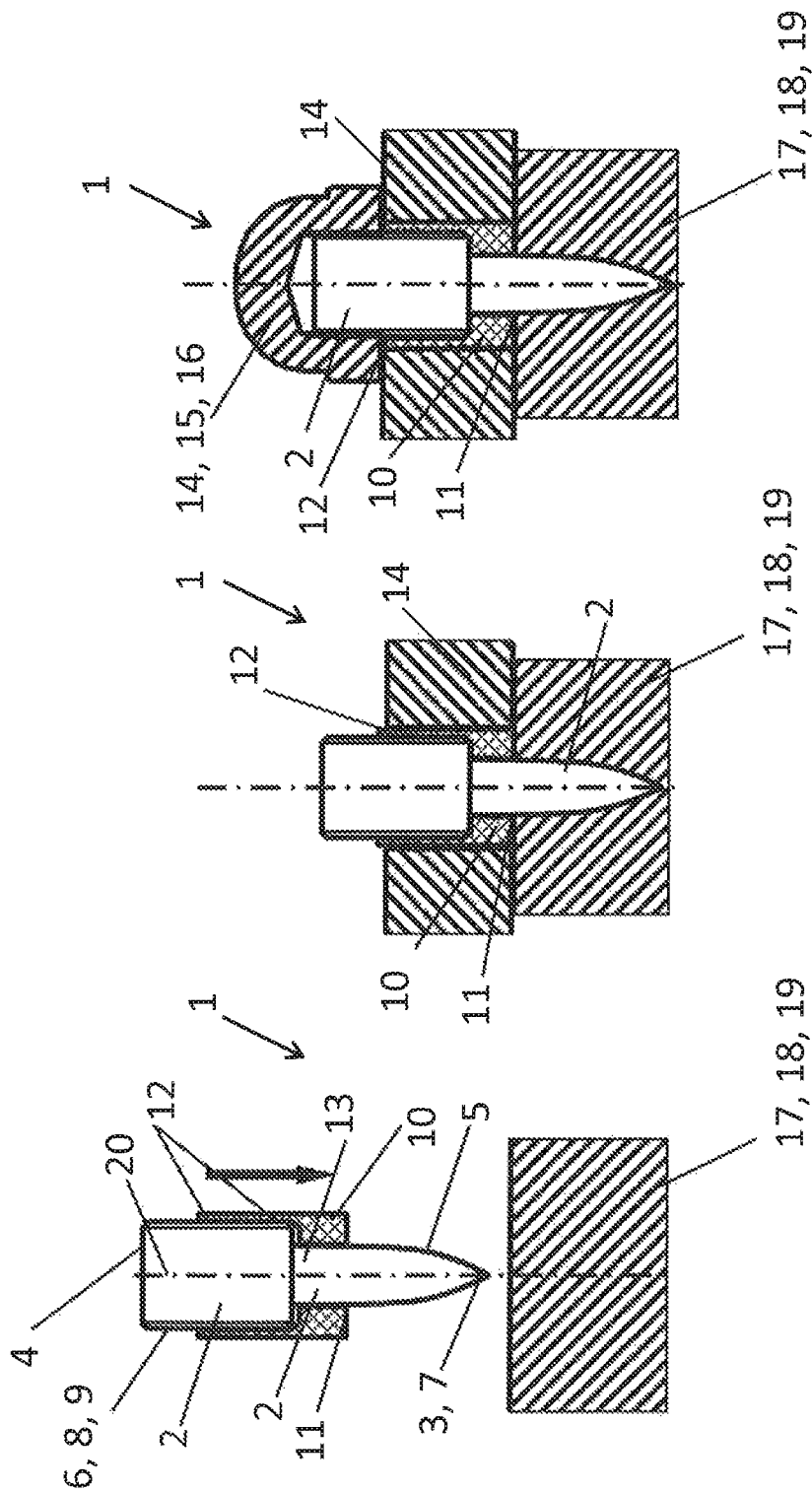

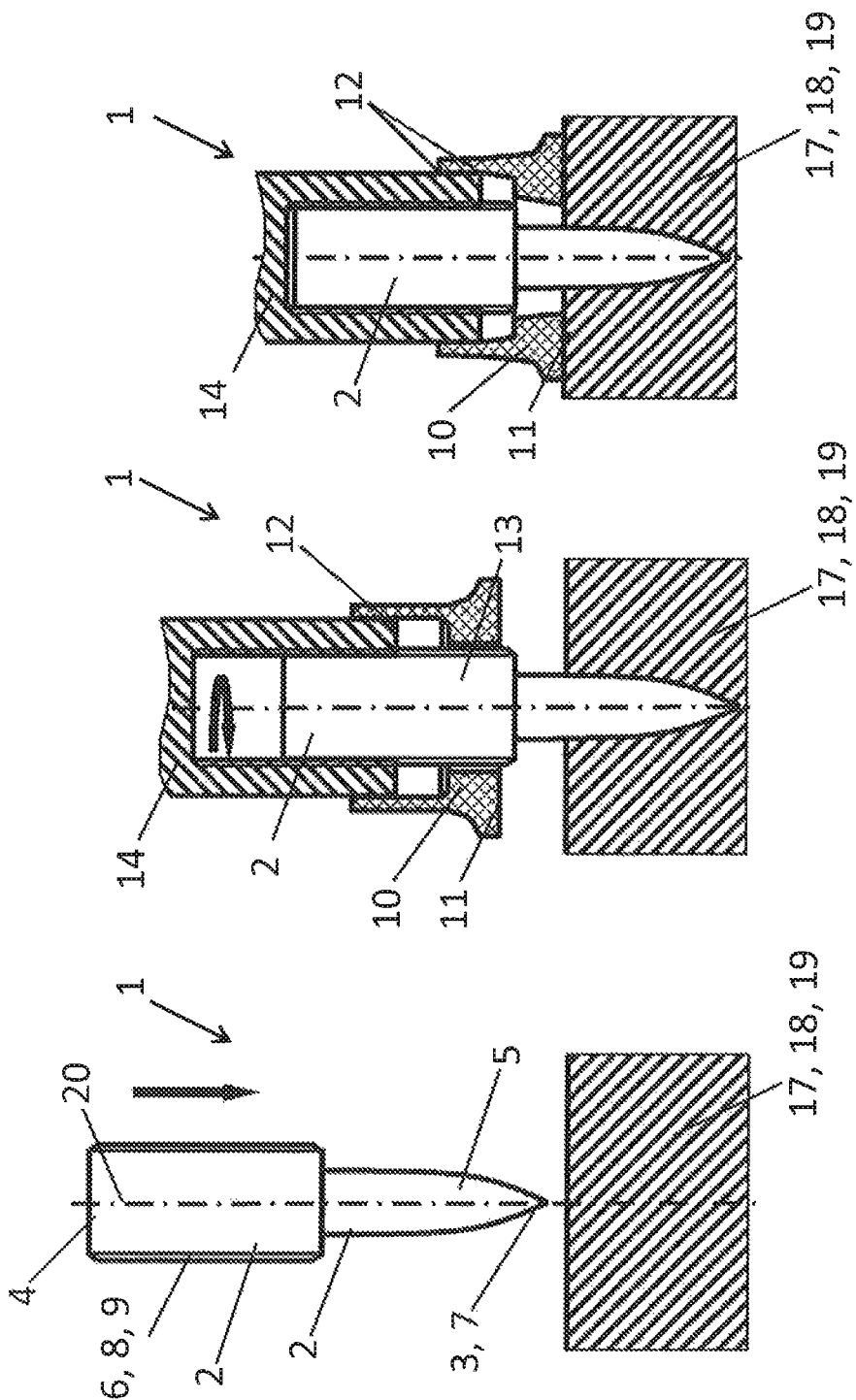

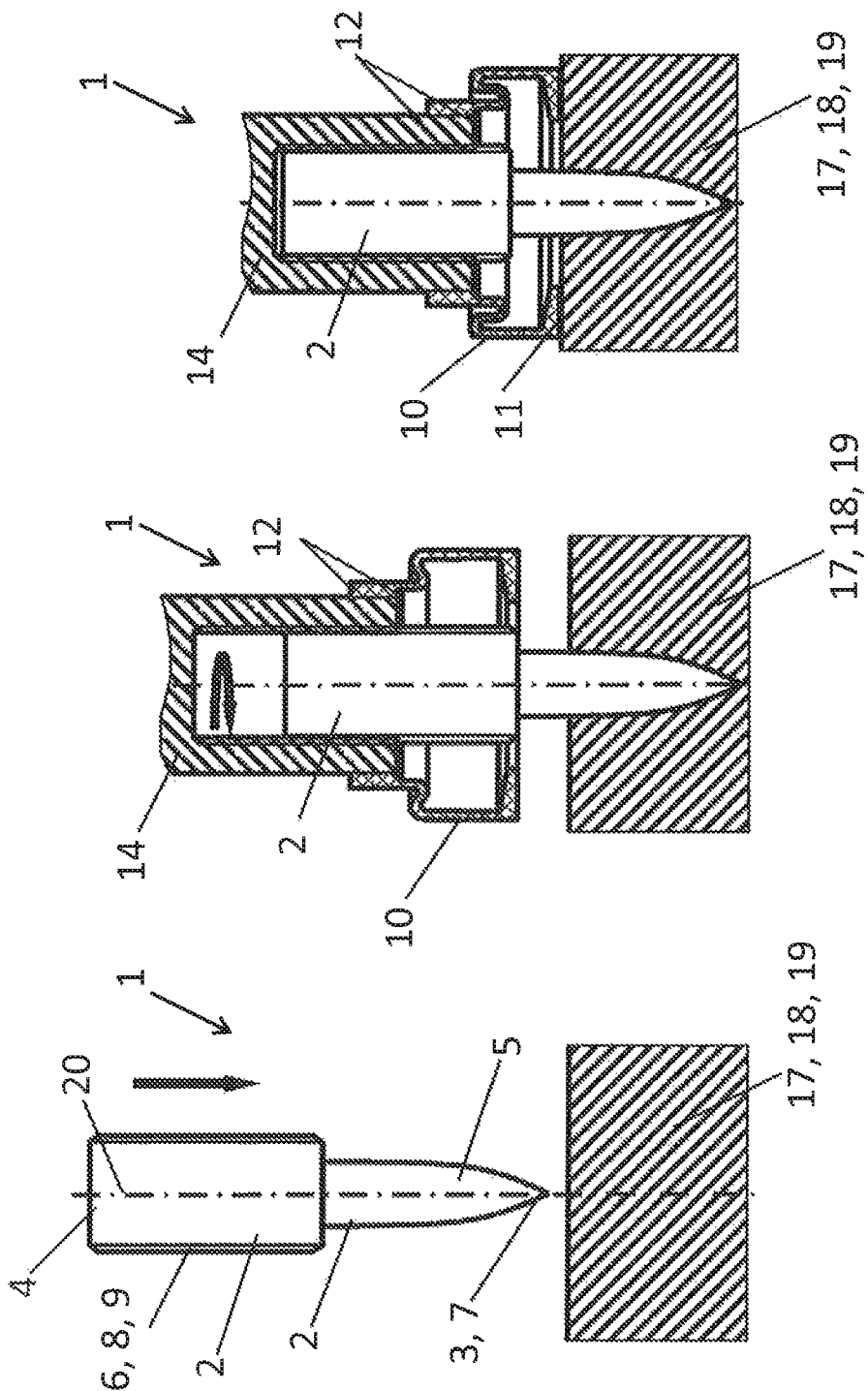

FASTENING SYSTEM

The present invention pertains to a fastening system according to the preamble of Claim 1 and to a method for fastening an add-on part on a setting object by means of a setting bolt according to the preamble of Claim 10.

Fastening systems are used in order to fasten an add-on part on a setting object by means of a setting bolt. The add-on part consists, for example, of a grating plate, an electric fastener or a spacer and the setting object consist, for example, of a metal plate, particularly a steel plate, or a concrete wall or concrete ceiling. The setting bolt features a fastening section and a load application section. The fastening section is realized in the form of a point and is inserted into the setting object by means of a setting device. In this case, the material of the setting object is deformed by the point on the fastening section of the setting bolt and the fastening section is thusly fastened on the setting object, particularly in a non-positive fashion. The add-on part can be fastened on the load application section of the setting bolt, for example, by means of a thread. After the setting bolt has been inserted into the setting object, it is subjected to water, water vapor or moisture under moist environmental conditions. This can lead to corrosion of the setting bolt. Even hydrogen embrittlement of the setting bolt may occur if it consists of C-steel. This can lead to a malfunction of the setting bolt such that the add-on part separates from the setting object.

DE 1 475 052 discloses a method for fastening an object such as, e.g., a plate on a supporting component, in which a setting bolt is shot into the supporting component through a fastening element that is relatively rigid in the axial direction and through the object to be fastened.

DE 10 2008 043 435 A1 describes a threaded bolt with a fastening section, a load application section, on which a thread is arranged, and a head. The load application section features a pin-shaped core region that is realized in one piece with the fastening section and the head, wherein the core region, the fastening section and the head consist of one material, and wherein a threaded sleeve of a plastic material that carries the thread is fixed on the radial outer side of the core region. In this case, the fastening section is provided with a plastic sealing element that has the shape of a flat ring.

It is the objective of the present invention to make available a fastening system and a method for fastening an add-on part on a setting object by means of a setting bolt, in which corrosion on the setting bolt can be permanently prevented.

This objective is attained with a fastening system for fastening an add-on part on a setting object by means of a setting bolt that comprises the setting bolt that features a first end and a second end with a fastening section and a load application section, a preferably ring-shaped or sleeve-shaped sealing element with an opening for sealing the setting bolt inserted into the setting object when the setting bolt is arranged within the opening, and preferably the add-on part such as, e.g., a grating plate, an electric fastener or a spacer for being fastened on the load application section of the setting bolt, wherein the axial dimension of the sealing element amounts to at least 5%, 10%, 20%, 30% or 50% of the axial dimension of the setting bolt before the setting bolt is set such that the sealing element abuts on the setting object with a first end and on the add-on part and/or the setting bolt with a second end in the inserted state of the setting bolt.

Due to the axial dimension of the sealing element, it abuts on the setting object as well as on the add-on part and/or the setting bolt in the inserted state of the setting bolt. The setting bolt is subjected to environmental influences such as, e.g., water or moisture after it has been set in the setting object (supporting component). Due to this axial dimension of the sealing element, it seals this axial section relative to the surroundings such that the setting bolt is not subjected to moisture from the environment. In this way, corrosion or hydrogen embrittlement on the setting bolt can be prevented. The setting bolt is advantageously capable of permanently withstanding high loads, wherein the setting bolt may furthermore be made of a material that is susceptible to corrosion because no corrosion occurs due to the seal produced with the aid of the sealing element. In this way, the costs for manufacture of the setting bolt can also be lowered. The second end of the sealing element may also consist of a second section or region of the sealing element independent of an end of the sealing element that lies opposite the first end.

The axial dimension of the sealing element is realized, in particular, such that the sealing element abuts on the setting object with a first end and on the add-on part and/or the setting bolt with a second end in the inserted state of the setting bolt.

In another embodiment, the inside diameter of the sealing element is larger than the maximum diameter of the setting bolt such that an axial section of the setting bolt is in an inserted state between the setting object and the second end, particularly the add-on part, completely enveloped by the sealing element. The inside diameter of the sealing element, particularly the maximum inside diameter of the sealing element, is larger than the maximum diameter of the setting bolt. In this way, the sealing element can completely enclose the setting bolt on the axial section and this section of the setting bolt is completely sealed relative to the surroundings due to the seal, i.e. the abutment of the sealing element on the setting object, as well as on the add-on part and/or the setting bolt.

In an additional embodiment, the maximum diameter of the setting bolt is only taken into consideration on an axial section of the setting bolt, on which the sealing element is arranged.

The sealing element preferably consists at least partially, in particular entirely, of an elastic material such as, e.g., an elastomer or plastic.

In an additional variation, the setting bolt has a diameter between 0.5 mm and 15 mm, preferably between 0.5 mm and 10 mm, particularly between 2 mm and 5 mm.

The setting bolt is advantageously provided with a point on its first end and/or the setting bolt is provided with a device for fastening the add-on part such as a thread, a bayonet coupling or a snap-on connection, particularly of plastic and/or metal, on the load application section. The setting bolt is driven or inserted into the setting object in the setting direction with the first end featuring the point.

In another embodiment, the sealing element is arranged and/or a fastened on the setting bolt. The sealing element is already fastened on the setting bolt when it is being set and the add-on part is subsequently fastened on the setting bolt with the sealing element.

The fastening system particularly comprises the add-on part, and the sealing element is arranged and/or fastened on the add-on part. The sealing element is not fastened on the setting bolt while it is set, and until the add-on part is fastened to the setting bolt, wherein the sealing element is or becomes arranged on or fastened to the add-on part, is the fastening system provided with the sealing element.

In another embodiment, the setting bolt consists at east partially, particularly entirely, of metal such as, e.g., steel, C-steel, stainless steel, copper or aluminum. The setting bolt appropriately consists of plastic, particularly glass fiber-reinforced plastic.

The inventive method for fastening an add-on part on a setting object by means of a setting bolt, particularly by means of a fastening system of the type described in this intellectual property application, features the steps of setting the setting bolt in the setting object such as, e.g., a concrete wall or a metal plate, connecting the add-on part to the setting bolt by fastening the add-on part on a load application section of the setting bolt and sealing the setting bolt by means of a preferably ring-shaped or sleeve-shaped sealing element with an opening, wherein the setting bolt is arranged within the opening and the sealing element, particularly a first end thereof, comes in contact with the setting object and thereby the sealing element, particularly a second end thereof, additionally comes in contact with the add-on part and/or the setting bolt such that the setting bolt is, in particular, completely sealed relative to the surroundings between the add-on part and the setting object. The sealing element therefore abuts on the add-on part as well as on the setting object, such that the setting bolt is completely enclosed and sealed by the sealing element in the axial section between the add-on part and the setting object, particularly due to the geometry of the sealing element. In this case, the setting bolt preferably is also sealed by the setting object and/or by the add-on part.

A part for fastening the add-on part such as, e.g., a cap nut is appropriately also considered to be an add-on part.

In an additional variation, the sealing element is elastically prestressed between the add-on part and the setting object after the setting bolt has been set.

In another variation, the sealing element is fastened on the setting bolt and/or the add-on part before the setting bolt is set.

In another embodiment, an axial section of the setting bolt between the add-on part and the setting object is completely enclosed by the sealing element after the setting bolt has been set.

The add-on part is particularly fastened on the setting bolt in a fluid-tight and dust-tight fashion such that the setting bolt is completely sealed relative to the surroundings due to the seal between the sealing element and the add-on part, as well as between the sealing element and the setting object.

In another embodiment, the shape of the sealing element is changed while the setting bolt is set, wherein, in particular, the sealing element is elastically deformed.

The setting bolt advantageously is completely enclosed by the sealing element on an axial section.

Exemplary embodiments of the invention are described in greater detail below with reference to the attached drawings. In these drawings:

FIG. 1 shows a longitudinal section through a first exemplary embodiment of a fastening system before the setting bolt is set in a setting object, FIG. 2 shows the fastening system according to FIG. 1 after the setting bolt has been set in the setting object and while the add-on part is being fastened on the setting bolt, FIG. 3 shows the fastening system according to FIG. 1 after the setting bolt has been set in the setting object and after the add-on part has been fastened on the setting bolt, FIG. 4 shows a longitudinal section through a second exemplary embodiment of the fastening system before the setting bolt is set in the setting object, FIG. 5 shows the fastening system according to FIG. 4 after the setting bolt has been set in the setting object and while the add-on part is being fastened on the setting bolt, FIG. 6 shows the fastening system according to FIG. 4 after the setting bolt has been set in the setting object and after the add-on part has been fastened on the setting bolt, FIG. 7 shows a longitudinal section through a third exemplary embodiment of a fastening system before the setting bolt is set in the setting object, FIG. 8 shows the fastening system according to FIG. 7 after the setting bolt has been set in the setting object and while the add-on part is being fastened on the setting bolt, FIG. 9 shows the fastening system according to FIG. 7 after the setting bolt has been set in the setting object and after the add-on part has been fastened on the setting bolt, FIG. 10 shows a longitudinal section through a fourth exemplary embodiment of a fastening system before the setting bolt is set in the setting object, FIG. 11 shows the fastening system according to FIG. 10 after the setting bolt has been set in the setting object and while the add-on part is being fastened on the setting bolt, and FIG. 12 shows the fastening system according to FIG. 10 after the setting bolt has been set in the setting object and after the add-on part has been fastened on the setting bolt.

FIGS. 1 to 3 show a first exemplary embodiment of a fastening system 1. The fastening system 1 comprises a setting bolt 2, a sealing element 10 and preferably an add-on part 14. The add-on part 14 can be fastened on a setting object 17 such as, e.g., a concrete wall 18 or a metal plate 19 with the aid of the setting bolt 2. The setting object 17 therefore represents the supporting component. The setting bolt 2 has a first end 3 and a second end 4. The setting bolt 2 is set by being inserted or driven into the setting object 2 parallel to a longitudinal axis 20 of the setting bolt 2 in the setting direction according to the direction of the arrow in FIG. 1, i.e., parallel to the longitudinal axis 20 of the setting bolt 2, with a not-shown setting device. A lower fastening section 5 of the setting bolt 2 is realized conically or in the form of a point 7 and the add-on part 14 can be fastened on a load application section 6. In this case, the load application section 6 features a device 8 for fastening the add-on part 14 such as, e.g., a thread 9. The load application section 6 therefore has an external thread and a bore of the add-on part 14 is provided with an internal thread that can be screwed into the external thread on the load application section 6 as shown in FIG. 2.

The sleeve-shaped sealing element 10 of an elastic plastic is already fastened on the setting bolt 2 before the setting bolt 2 is set. The sealing element 10 has a first end 11 and a second end 12 and the fastening section 5, as well as the load application section 6, of the setting bolt 2 is arranged within an opening 13 of the sealing element 10 or abuts thereon (FIG. 1).

After the setting bolt 2 has been set in the setting object 17 (FIG. 2), the fastening section 5 is essentially fastened on the setting object 17 in a non-positive and preferably also a positive fashion. In this case, the first end 11 of the sealing element 10 abuts on the setting object 17 and the sealing element 10 completely encloses an axial section of the setting bolt 2, on which the sealing element 10 abuts. When the add-on part 14 is screwed on the load application section 6 of the setting bolt 2, the add-on part 14 abuts on the second end 12 of the sealing element 10 such that the elastic sealing element 10 abuts on the add-on part 14, as well as on the setting object 17, and is elastically prestressed between the add-on part 14 and the setting object 17. The add-on part 14 encloses the setting bolt 2 in a fluid-tight fashion and the setting bolt 2 is sealed relative to the surroundings in a fluid-tight and dust-tight fashion due to the seal of the axial section of the setting bolt 2 between the add-on part 14 and the setting object 17 as shown in FIG. 3. In this way, damage due to corrosion or hydrogen embrittlement can be advantageously prevented on the setting bolt 2 when water or moisture is present in the surroundings. In the first exemplary embodiment, the sealing element 10 is fastened on the setting bolt 2 such that it can be referred to as a setting bolt sealing element 10.

FIGS. 4 to 6 show a second exemplary embodiment of the fastening system 1. In essence, only the differences with respect to the first exemplary embodiment according to FIGS. 1 to 3 are described below. The add-on part 14 features a bore and the sealing element 10 is arranged within this bore after the setting bolt 2 has been set. In this case, the add-on part 14 is fastened on the load application section 6 provided with the external thread by means of a part 15 for fastening the add-on part 14, namely a cap nut 16, as shown in FIG. 6. In this context, the part 15 is also considered to be an add-on part 14 and the sealing element 10 in FIG. 6 is elastically prestressed in the radial direction between the part 15, i.e. the cap nut 16, and the setting object 17 analogous to the first exemplary embodiment. In this way, the setting bolt 2 is also sealed relative to the surroundings in a fluid-tight and dust-tight fashion in the second exemplary embodiment. The sealing element 10 is also fastened on the setting bolt 2 in the second exemplary embodiment such that it can also be referred to as a setting bolt sealing element 10 in the second exemplary embodiment.

FIGS. 7 to 9 show a third exemplary embodiment of the fastening system 1. In essence, only the differences with respect to the first exemplary embodiment are described below. When the setting bolt 2 is set, the sealing element 10 is not fastened on the setting bolt 2, but rather on the add-on part 14. The sealing element 10 therefore can be referred to as an add-on part sealing element 10. When screwing on the add-on part 14, on which the sealing element 10 is fastened, the sealing element 10 is already in contact with the add-on part 14 such that the add-on part 14 is already sealed relative to the sealing element 10. While the add-on part 14 is screwed on downward in the setting direction, the sealing element 10 comes in contact with and abuts on the setting object 17 and the sealing element 10 is elastically prestressed between the add-on part 14 and the setting object 17 as the add-on part 14 is screwed further into the thread on the load application section 6. In this way, the setting bolt 2 is advantageously sealed relative to the surroundings in a fluid-tight and dust-tight fashion because the sealing element 10 completely encloses the setting bolt 2 on an axial section of the setting bolt 2 and the sealing element 10 abuts on the add-on part 14 and on the setting object 17 in a fluid-tight fashion.

FIGS. 10 to 12 show a fourth exemplary embodiment of the fastening system 1. In essence, only the differences with respect to the third exemplary embodiment according to FIGS. 7 to 9 are described below. As in the third exemplary embodiment, the sealing element 10 is fastened on the add-on part 14 rather than on the setting bolt 2 such that it can be referred to as an add-on part sealing element 10. However, the shape of the sealing element 10 differs from the third exemplary embodiment of the fastening system 1. Between the first end 11 and the second end 12, the cross section of the sealing element 10 is in a section partially realized in the form of an S-shaped tube and an elastic prestress of the sealing element is essentially realized due to a deformation of this S-shaped section of the sealing element 10 after the setting bolt 2 has been set as shown in FIG. 12.

All in all, the inventive fastening system 1 is associated with significant advantages. The sealing element 10 of an elastic material makes it possible to completely seal the setting bolt 2 relative to the surroundings in the set state such that corrosion or hydrogen embrittlement on the setting bolt 2 can also be prevented in a moist environment.

The invention claimed is:

1. A fastening system for fastening an add-on part on a setting object by a setting bolt, comprising
a setting bolt having a bolt first end and a bolt second end, with a fastening section and a load application section;
a sealing element having an element first end and an element second end, with an opening for sealing the setting bolt inserted into the setting object when the setting bolt is arranged within the opening, wherein the sealing element consists at least partially of an elastic material; and
the add-on part fastened on the load application section of the setting bolt wherein the sealing element has an axial dimension such that the sealing element abuts on the setting object with the element first end, and on the add-on part and/or the setting bolt with the element second end.

2. The fastening system according to claim 1, wherein the setting bolt has an axial dimension and the axial dimension of the sealing element amounts to at least 5% of the axial dimension of the setting bolt before the setting bolt is set.

3. The fastening system according to claim 1, wherein the sealing element has an inside diameter and the setting bolt has a maximum diameter, and the inside diameter of the sealing element is larger than the maximum diameter of the setting bolt such that with the sealing element, an axial section of the setting bolt is in an inserted state between the setting object and the element second end, completely enveloped by the sealing element.

4. The fastening system according to claim 3, wherein the maximum diameter of the setting bolt is only taken into consideration on an axial section of the setting bolt, on which the sealing element is arranged.

5. The fastening system according claim 1, wherein the sealing element consists entirely of an elastomer.

6. The fastening system of claim 1, wherein the sealing element is entirely plastic.

7. The fastening system according to claim 1, wherein the setting bolt has a point on the bolt first end and/or the setting bolt comprises a load application section, and, on the load application section, a device for fastening the add-on part.

8. The fastening system according to claim 1, wherein the sealing element is arranged and/or fastened on the setting bolt.

9. The fastening system according to claim 1, wherein the fastening system comprises the add-on part and the sealing element is arranged and/or fastened on the add-on part.

10. The fastening system according claim 1, wherein the setting bolt consists at least partially of metal.

11. The fastening system of claim 10, wherein the setting bolt is entirely metal.

12. The fastening system according to claim 1, wherein the setting bolt has an axial dimension and the axial dimension of the sealing element amounts to at least 10% of the axial dimension of the setting bolt before the setting bolt is set.

13. The fastening system according to claim 1, wherein the setting bolt has an axial dimension and the axial dimension of the sealing element amounts to at least 20% of the axial dimension of the setting bolt before the setting bolt is set.

14. The fastening system according to claim 1, wherein the setting bolt has an axial dimension and the axial dimension of the sealing element amounts to at least 30% of the axial dimension of the setting bolt before the setting bolt is set.

\* \* \* \* \*